(12) United States Patent
Hayashi et al.

(10) Patent No.: US 7,910,148 B2
(45) Date of Patent: *Mar. 22, 2011

(54) APPARATUS AND METHOD FOR BEATING AND ROLLING A FOOD DOUGH BELT

(75) Inventors: Torahiko Hayashi, Utsunomiya (JP); Michio Morikawa, Utsunomiya (JP); Sadao Ueno, Utsunomiya (JP)

(73) Assignee: Rheon Automatic Machinery Co., Ltd., Tochigi-ken (JP)

( * ) Notice: Subject to any disclaimer, the term of this patent is extended or adjusted under 35 U.S.C. 154(b) by 769 days.

This patent is subject to a terminal disclaimer.

(21) Appl. No.: 10/458,574

(22) Filed: Jun. 10, 2003

(65) Prior Publication Data

US 2003/0228388 A1 Dec. 11, 2003

(30) Foreign Application Priority Data

Jun. 10, 2002 (JP) .................. 2002-169149
Sep. 3, 2002 (JP) .................. 2002-258135
Sep. 3, 2002 (JP) .................. 2002-258136

(51) Int. Cl.
*A21C 3/02* (2006.01)

(52) U.S. Cl. ........ 426/560; 426/504; 426/517; 426/502; 425/363; 425/373

(58) Field of Classification Search .................. 426/502, 426/517, 496, 504, 560; 99/349, 353; 425/363, 425/373, 367

See application file for complete search history.

(56) References Cited

U.S. PATENT DOCUMENTS

| | | | | |
|---|---|---|---|---|
| 4,731,008 A | * | 3/1988 | Hayashi et al. | 425/335 |
| 4,877,632 A | * | 10/1989 | Vinas I Nogueroles | 426/502 |
| 4,880,375 A | * | 11/1989 | Hayashi | 425/335 |
| 5,246,363 A | * | 9/1993 | Morikawa et al. | 425/335 |
| 5,733,589 A | * | 3/1998 | Oki | 425/364 R |
| 5,843,510 A | * | 12/1998 | Hayashi | 426/502 |
| 6,082,988 A | * | 7/2000 | Muller et al. | 425/363 |
| 6,117,472 A | * | 9/2000 | Yonemaru et al. | 426/496 |
| 6,257,861 B1 | * | 7/2001 | Morikawa | 425/363 |
| 7,205,017 B2 | * | 4/2007 | Hayashi et al. | 426/502 |

FOREIGN PATENT DOCUMENTS

| | | | |
|---|---|---|---|
| EP | 0 128 015 | | 12/1984 |
| EP | 0 170 436 | | 2/1986 |
| EP | 0 179 645 | | 4/1986 |
| EP | 0 309 005 | | 3/1989 |
| EP | 0 740 902 | | 11/1996 |
| EP | 1 203 533 | | 5/2002 |
| GB | 1 462 440 | | 1/1977 |
| JP | 61100144 | | 5/1986 |
| JP | 0919256 | * | 1/1997 |
| JP | 377554 | | 6/2002 |
| JP | 254687 | | 3/2003 |

* cited by examiner

*Primary Examiner* — Drew E Becker
*Assistant Examiner* — Steven Leff
(74) *Attorney, Agent, or Firm* — Sughrue Mion, PLLC (57) ABSTRACT

A method and apparatus for beating and rolling a fermented dough belt between rolling members to release surplus fermentation gases in the dough belt has a first rolling member having a plurality of rolling rollers. Each rolling roller of the plurality moves sequentially upstream from downstream and beats and rolls the dough belt. A second large diameter conveying rolling member conveys and moves the dough belt between the first and the second rolling members.

7 Claims, 12 Drawing Sheets

APPARATUS AND METHOD FOR BEATING AND ROLLING A FOOD DOUGH BELT

FIELD OF THE INVENTION

This invention relates to a prior treatment for various ways of forming fermented dough, such as bread dough, and, particularly, to an apparatus and a method for rolling a fermented dough belt to release surplus gas from the fermented dough, to make uniform the internal structure of the dough, and to convey the thinly rolled dough belt to the next processes.

BACKGROUND OF THE INVENTION

The purpose of the release of the gas of bread dough is to remove the carbon dioxide within the bread dough, to make uniform the temperature and humidity of the bread dough, to equalize the density in the bread dough, and to promote the development of gluten and the continuation of the water absorption function based on the new activity of the dough (see page 53 of *Breadmaking Method*, by Daijiro Karishe).

The conventional means for solving these problems was to roll a bread dough belt between rolling-rollers facing each other that were installed in a so-called molder (see JP 44-6607 B).

When viscoelastic food dough such as bread dough is mechanically formed, no elasticity of the food dough is necessary. Conventionally, to mechanically form viscoelastic food dough, it is necessary to generate a stress beyond the yield point of the elasticity of the food dough. But, in such a mechanical forming, it is almost impossible to naturally recover the lost elasticity. Therefore, as the elasticity of the food dough is very important in order to maintain the quality of the fermentated food product like bread, the manual work of the skilled craftsman was always required in the process of forming food dough.

This applicant has provided conventional and various rolling apparatuses to solve the above problems, for example, a rolling apparatus comprising conveyers, arranged in a series, in which the speed of a downstream conveyer is faster than that of an upstream conveyer, and a plurality of rolling-rollers are arranged above the conveyers (see JP 44-6607 B, JP 60-52769 B and JP 2917002 C).

Patent Document 1: JP-S 44-6607 B
Patent Document 2: JP-S 60-52769 B (referring to Pages 2, 3, and FIG. 4)
Patent Document 3: JP 2917002 C (referring to Pages 2, 3 and FIGS. 1-5)
Patent Document 4: JP-S51-15107 B According to the prior art, for example, when rolling-rollers mounted on fixed axes stretch or roll a bread dough belt therebetween, fermentation-gas in the bread dough belt may be discharged but, at the same time, the gluten structure in the bread dough belt may be damaged.

Also, conventionally, when various kinds of bread dough are stretched or rolled into a thin belt made from a thick belt, wrinkles may be generated on the surface of the belt because of properties of the bread dough, mechanical conditions, etc. Further, when a bread dough belt is stretched or rolled while air bubbles are kept in the surface layer, the gluten structure in the bread dough belt is harmed.

SUMMARY OF THE INVENTION

In order to solve the problems as described above, this invention provides rolling means for releasing gas within fermented food dough, such as bread dough, without harming the gluten network.

The gel structure of bread dough has a properties easily fluidized by beats, impacts, vibrations or the like. The fluidization of the bread dough is controlled by using such properties.

According to this invention, a prior treatment for well controlling the quality of bread (taste, flavor, etc.) becomes possible.

According to this invention, a plurality of rolling rollers move sequentially upstream from downstream to beat and roll a fermented dough belt being conveyed. Consequently, surplus gas existing in the belt is released upstream of the rolling roller.

The first means for solving the problem is an apparatus for beating and rolling a fermented dough belt between rolling members to release the surplus or unnecessary gas from the fermented dough belt, comprising a first rolling member having a plurality of rolling-rollers, each of which moves sequentially upstream from downstream, beats and rolls the dough belt being conveyed, and a second rolling member, which conveys and rolls the dough belt between the first and second rolling members.

The second means for solving the problem is a method for beating and rolling a fermented dough belt between rolling members to release the surplus or unnecessary gas from the fermented dough belt, comprising beating and rolling the dough belt being conveyed on a conveying and rolling roller, by a plurality of rolling rollers sequentially moving upstream from downstream on the dough belt.

Accordingly, a plurality of rolling rollers moving sequentially upstream from downstream push back bubbles, which include fermentation-gas in the surface layer of the dough belt, while the roller rolls the fermented dough belt momentarily, and then release the surplus gas from the dough belt upstream of the rolling roller.

BRIEF DESCRIPTION OF THE DRAWINGS

FIG. 4(*a*) shows a schematic view of some prior art.

FIG. 4(*b*) shows a schematic view of an embodiment of this invention.

DETAILED DESCRIPTION OF THE PREFERRED EMBODIMENTS

Figure 1:
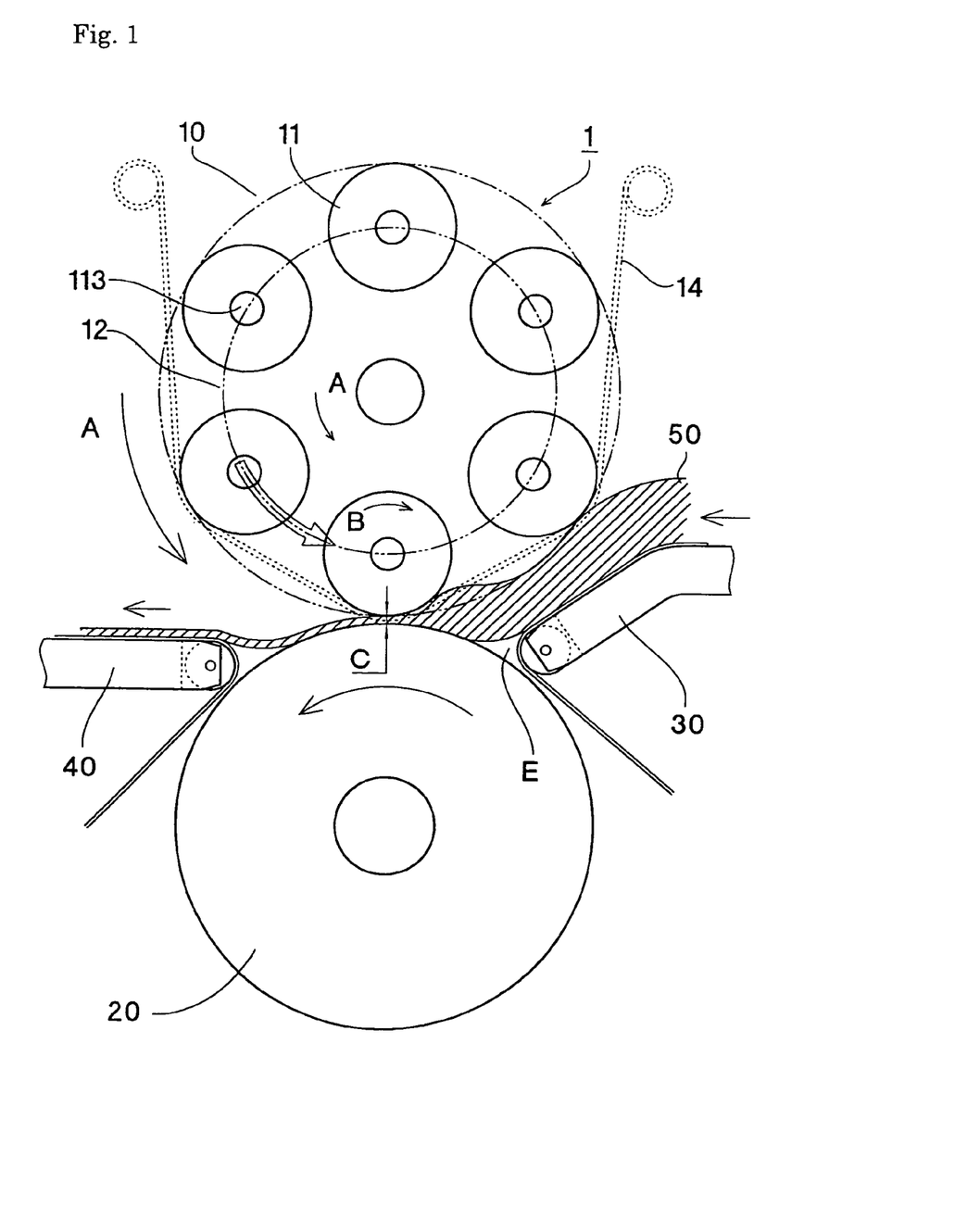
FIG. 1 shows a schematic elevational-view of an embodiment of this invention.

FIG. 1 shows a schematic elevational-view of an embodiment of this invention. A rolling apparatus 1 comprises a rolling member 10, such as a planetary roller mechanism, arranged with rolling rollers 11, and a rolling member 20, facing the rolling member 10, such as a conveying and rolling roller with a large diameter. A gap is arranged between the planetary roller mechanism 10 with the rolling rollers 11 and the rolling roller 20. A dough belt is supplied in the gap via a supplying conveyer 30 and rolled to a predetermined thickness by the beating or striking rolling-rollers 10 and the conveying rolling-roller 20. A discharge conveyer 40 is arranged to be connected downstream of the conveying rolling-roller 20.

The planetary roller mechanism 10 comprises a plurality of planetary rollers 11 moving in an endless orbit (for example, a circular orbit as shown in FIG. 1). The planetary rollers 11 are rotatable about their shafts 113, each of which is secured at equal intervals on a circle of a wheel 12.

Each of the planetary rolling-rollers 11 is arranged along the transporting surfaces of the feeding conveyer 30 and the rolling roller 20 facing the planetary rolling-rollers 11.

The planetary rolling-roller 11 revolves in the direction of an arrow A as shown in FIG. 1 on the axis of the wheel 12 in accordance with the rotation of the wheel 12. At the same time, the planetary rolling-roller 11 rotates in the direction of the arrow B shown in FIG. 1 around its own axis by contacting a friction-belt 14 with the lower part of planetary roller mechanism 10, in accordance with the rotation of the wheel 12. The planetary rolling-roller 11 rotates around its own axis and, at the same time, it revolves on an axis on other than its own, such as the axis of the wheel 12.

As the speed of revolution of the planetary rolling-rollers 11 is decided by the speed of rotation of a wheel 12, the speed of revolution of the planetary rolling-rollers 11 can be changed, if necessary.

The planetary rolling-rollers 11 are rotated forcibly by friction with the fastened friction-belt 14 as shown in FIG. 1. But the rotation of the planetary rollers 11 may be carried out by means other than that of the fastened friction-belt 14. For example, the rotation may be carried out by means of a circulating endless friction-belt with variable speeds (see JP 2003-176904A). Using this means, by changing the speed of the endless friction-belt belt, it is possible to change the rotating velocity of the planetary rollers 11. Consequently, it becomes possible to adjust the relationship between the revolution speed and the rotating velocity of the planetary rollers 11, and to carry out a moderate and calculated rolling-contact with the dough belt 50.

For another example, a gear having the same diameter is installed in each respective shaft of the planetary rollers. A gear engaging the gears of the planetary rollers and having variable speeds to be adjusted is arranged in the center of the revolution of the planetary rollers. Therefore, the rotation velocity of the planetary rollers can be changed based on their revolution speed.

A rolling roller 20, acting as a rolling member, together with a planetary roller 11 acting as another rolling member, rolls a dough belt 50 conveyed between them. The diameter of the rolling roller 20 is larger than that of planetary roller 11. The rolling roller 20 is rotated in the conveying direction of the dough belt 50 by a driving motor.

As illustrated above, bread dough 50 is rolled through a gap C between the planetary rolling-roller 11 and the rolling-roller 20 facing it. During that time, the planetary rollers 11 are moved upstream from downstream, in relation to the bread dough 50 being conveyed, and the rolling position of the bread dough 50 is also moved upstream from downstream. A plurality of planetary rolling-rollers 11 repeats such a movement sequentially. Consequently, bubbles which include fermentation-gas, in the bread dough 50, are transferred to the upstream side of the bread dough 50 and discharged at the upstream side of the planetary rolling-roller 11.

In the prior art, a planetary roller mechanism was adopted as well. But planetary rollers in it move in the conveying direction of the dough belt.

Figure 4:
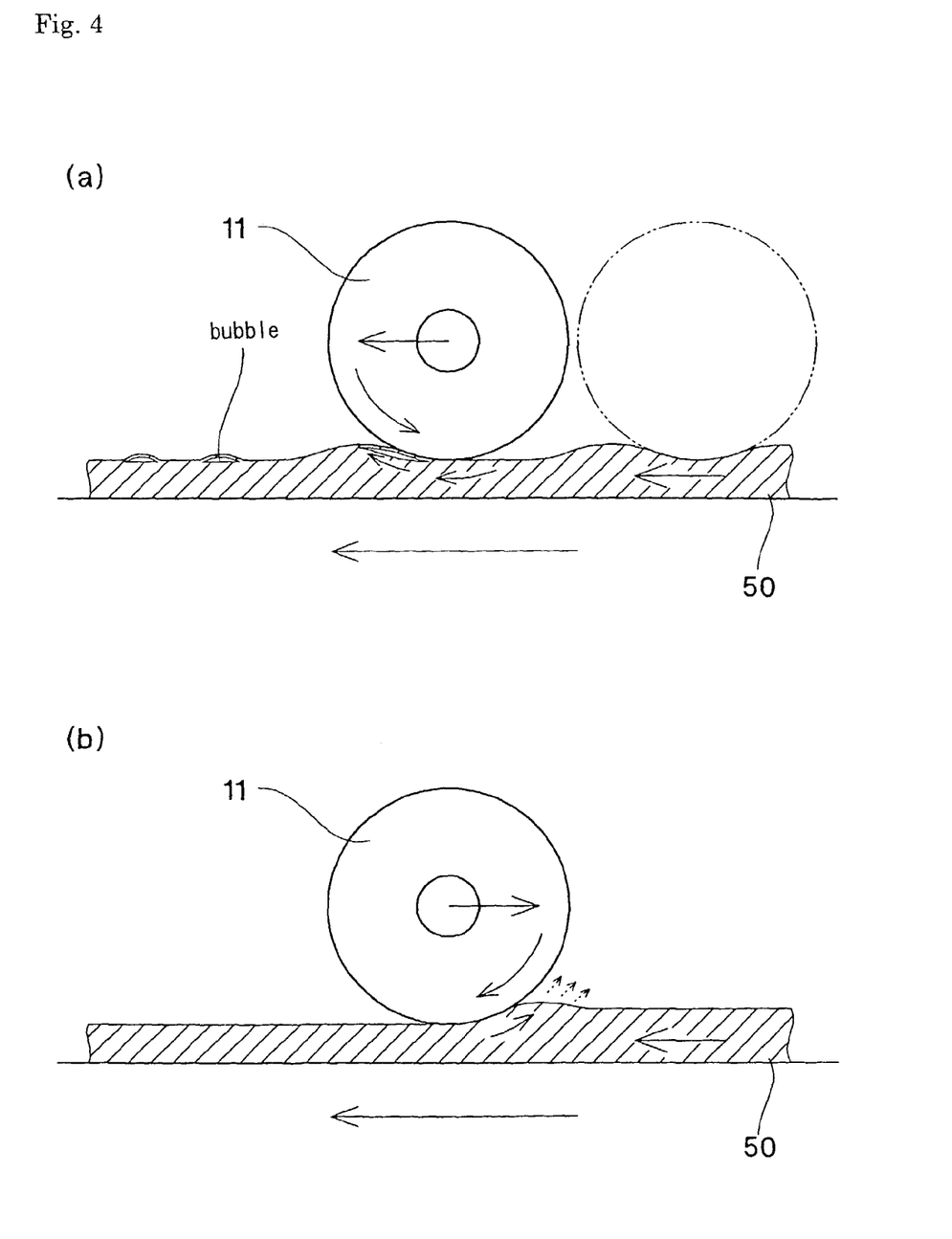

FIG. 4(*a*) shows a schematic view of some prior art. FIG. 4(*b*) shows a schematic view of an embodiment of this invention.

According to this prior art, when a planetary-roller 11 rotates anti-clockwise and moves downstream from upstream on rolling-contact with the dough belt 50, the dough belt 50 is rolled thinly. But the air bubbles of fermentation-gas in the outer layer of the dough belt remain and shift downstream. Therefore, the air bubbles 50-1 lie scattered in the surface layer of the bread dough.

However, according to this invention, a planetary-roller 11 rotates clock-wise and moves upstream from downstream on the dough belt 50 as shown in FIG. 4(*b*). It should be noted that in the embodiments of this invention the planetary roller 11 pushes back the air bubbles, including the fermentation-gas in the outer layer of the bread dough, to the upstream-side of the roller 11, and the air bubbles vanish from the outer layer, as shown in FIG. 4(*b*). The dough belt is rolled between the planetary-roller and the large roller that face each other, is formed into a dough sheet, and conveyed on a belt conveyer 40. The surface of the dough sheet is smooth (without any wrinkles). The appearance of the bread made of this bread dough shows that it swells greatly. The inside quality of the bread is fine as a whole.

Figure 2:
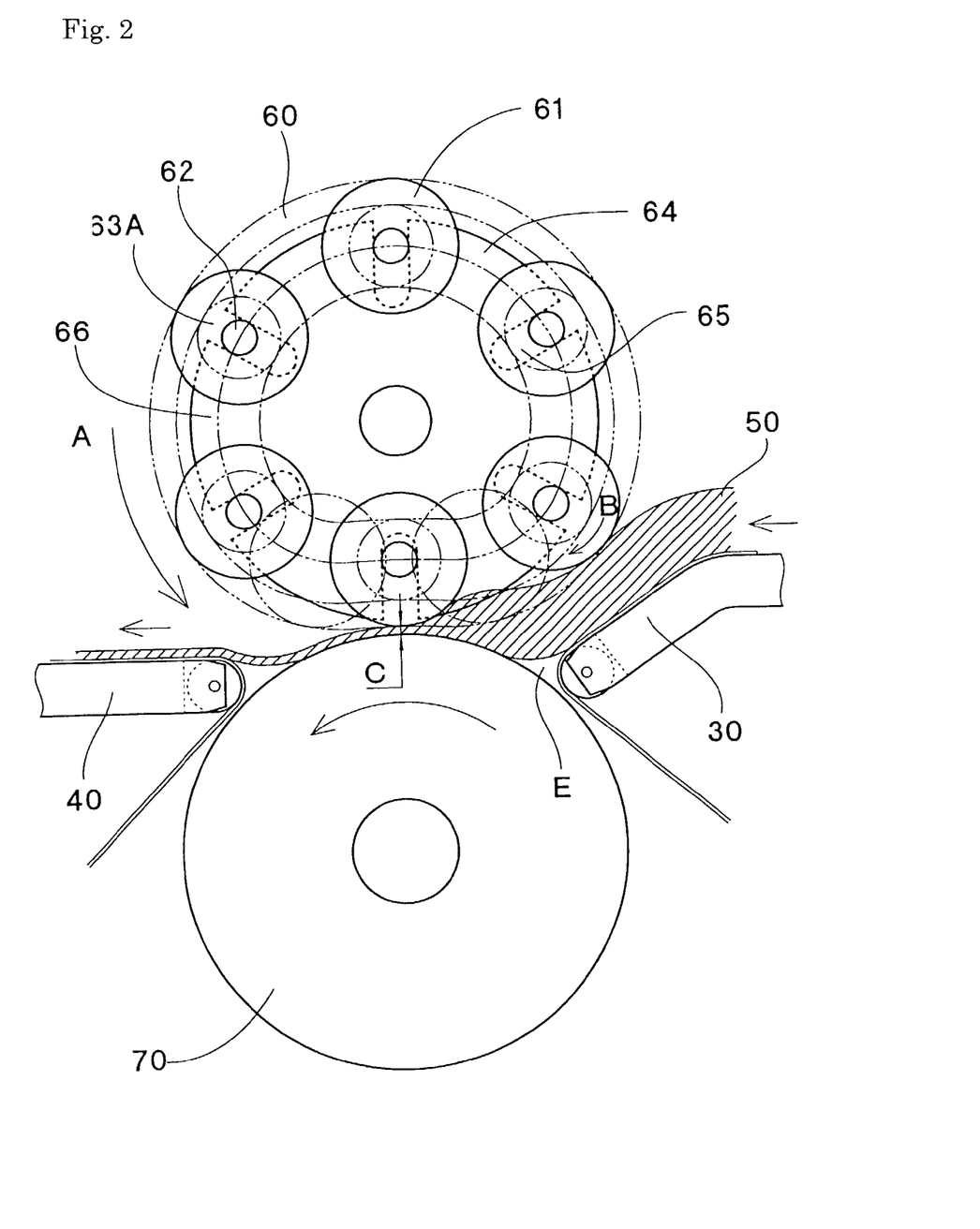
FIG. 2 shows a schematic elevational-view of another embodiment of this invention.
Figure 3:
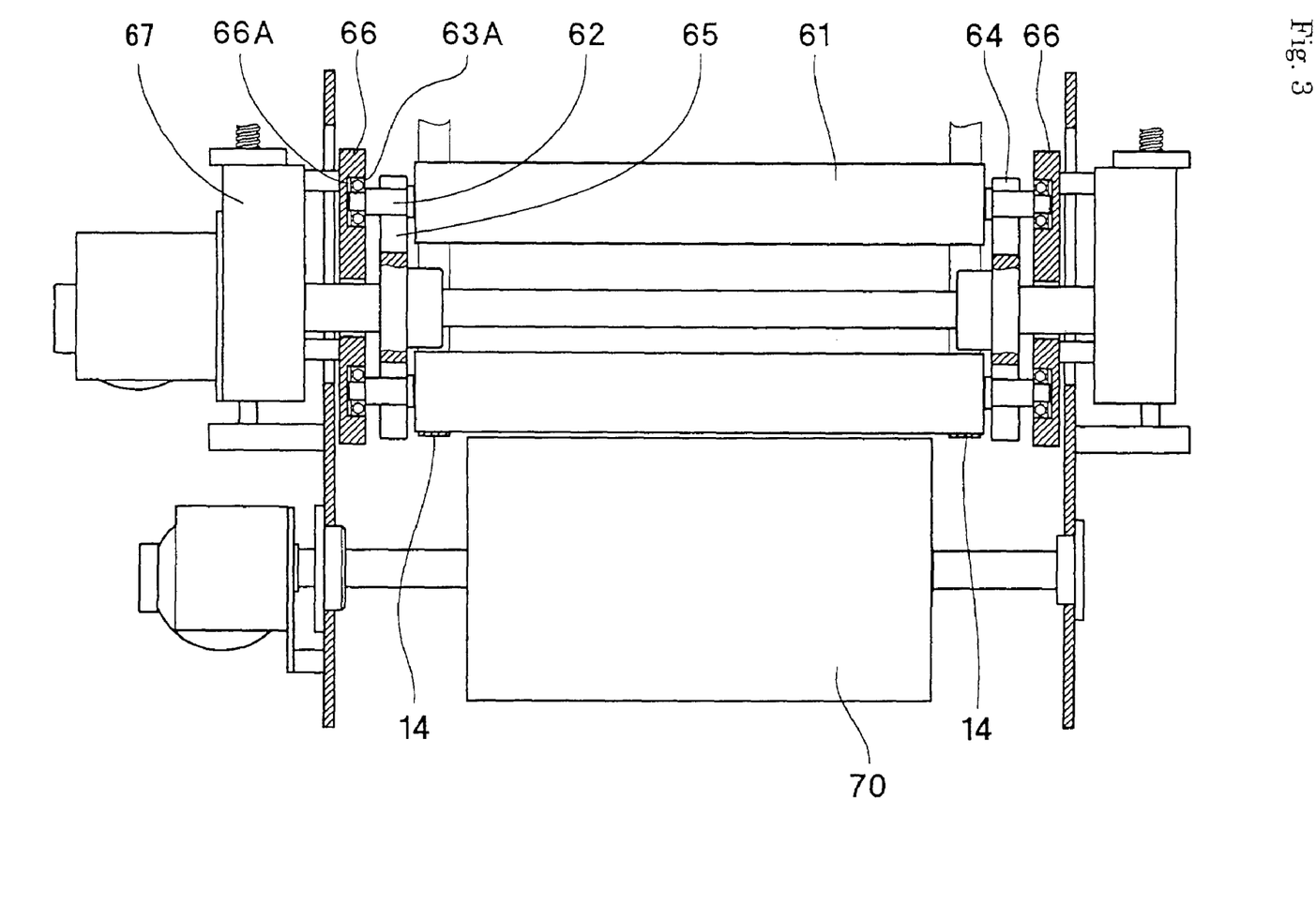
FIG. 3 shows a schematic side view of the embodiment shown in FIG. 2.

FIG. 2 shows a schematic front view of the second embodiment of this invention. FIG. 3 shows a schematic side view of the embodiment. In this embodiment, the orbit of the planetary rollers 11 is not a perfect circle but has a recess along the peripheral surface of a roller 70. In the following, the description about the same components as those of the first embodiment will be abbreviated.

Shafts 62 of planetary rollers 61 are put in grooves 65 arranged at equal intervals in a wheel 64, and guided in the radial direction by grooves 65. Two grooved cams 66 are fixed to a frame 67 outside of a wheel 64. As journals 63A of shafts 62 are caught in grooves 66A of the grooved cams 66, the movements of the planetary rollers 61 are regulated in the radial directions.

Therefore, when the wheel 64 rotates, the planetary rollers 61 revolve along grooves 66A of the grooved cams 66.

The planetary rollers 61 move upstream from downstream in the lower part of the planetary roller mechanism 60. Then, the planetary rollers 61 rotate in the direction of the arrow B as shown in FIG. 1 or 2 by contacting a friction belt 14. A section where each planetary roller 61 can move along a peripheral surface of a roller 70 guided by the grooved cam 66 can be arranged. Accordingly, the distance over which each planetary roller 61 rolls the bread dough 50 can be lengthened.

A gap C and the thickness of the rolled bread dough 50 can be varied and adjusted by an up-and-down movement of the planetary roller mechanism 60 or the roller 70.

When bread dough is rolled not only between a planetary roller and a rolling roller but also between a planetary roller and a feeding conveyer, the released fermentation-gas from the bread dough by the rolling is increased.

When an additional space E has been formed between a rolling-roller 20 and a supply conveyor 30, the bread dough 50 vibrates up and down in the space E, whenever a planetary rolling-roller 11, 61 passes above the space E. Consequently, especially the fermentation-gas remaining in the lower layer of the bread dough 50 is released.

Moreover, if another roller with transporting and rolling functions is arranged between the rolling-rollers 20, 70 and a feeding conveyer 30, to increase the number of the spaces E under the dough belt 50, it will be easier to have released any residual fermentation-gas within the bread dough belt 50 from its upper and lower surfaces.

Further, when the rolling roller returns downstream from upstream, the rolling roller must be lifted above the dough belt. Accordingly, when the rolling roller reciprocates along the dough belt, it may be lifted above the dough belt in its returning process. The orbit of the rolling roller is not limited to that of a planetary roller mechanism.

Figure 5:
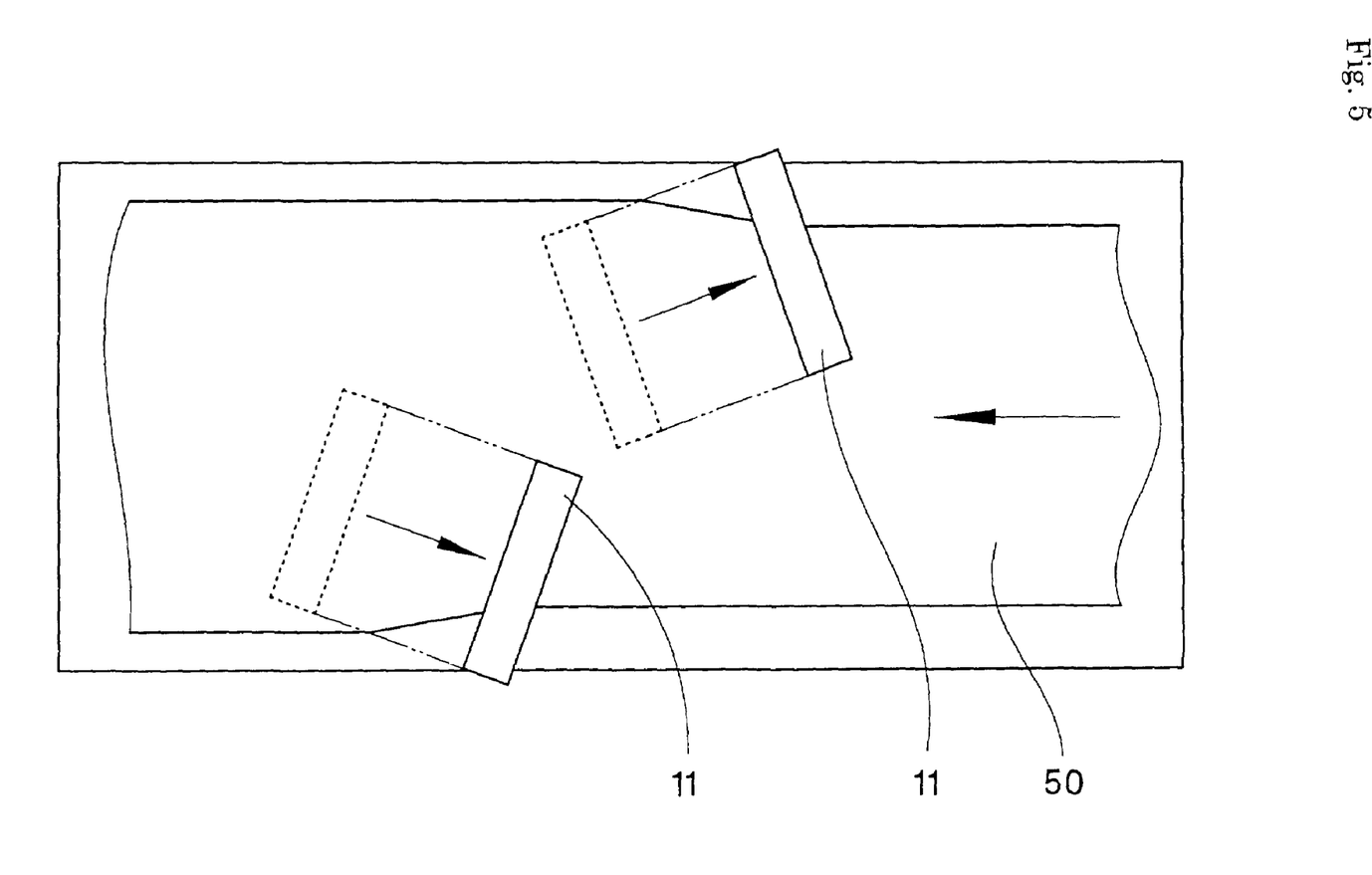
FIG. 5 shows a schematic plan view of an embodiment of this invention.

FIG. 5 shows a schematic plan view of an embodiment of this invention. The direction that the rolling roller 11 moves need not coincide with the conveying direction of the dough belt being conveyed. In other words, the rotating shaft of a rolling roller need not be perpendicular to the conveying direction that the bread dough is being conveyed. For example, two sets of planetary roller mechanisms may be arranged diagonally to the direction of the transfer, as shown in FIG. 5, and the two sets may roll the dough belt also in crossing diagonal directions, and release the gas inside the dough belt.

Furthermore, the dough belt 50 is rolled more preferably by the minutely vibrating rolling-roller 20, 70 having a vibrating-device as shown in JP 2003-61561, of this applicant.

Figure 6:
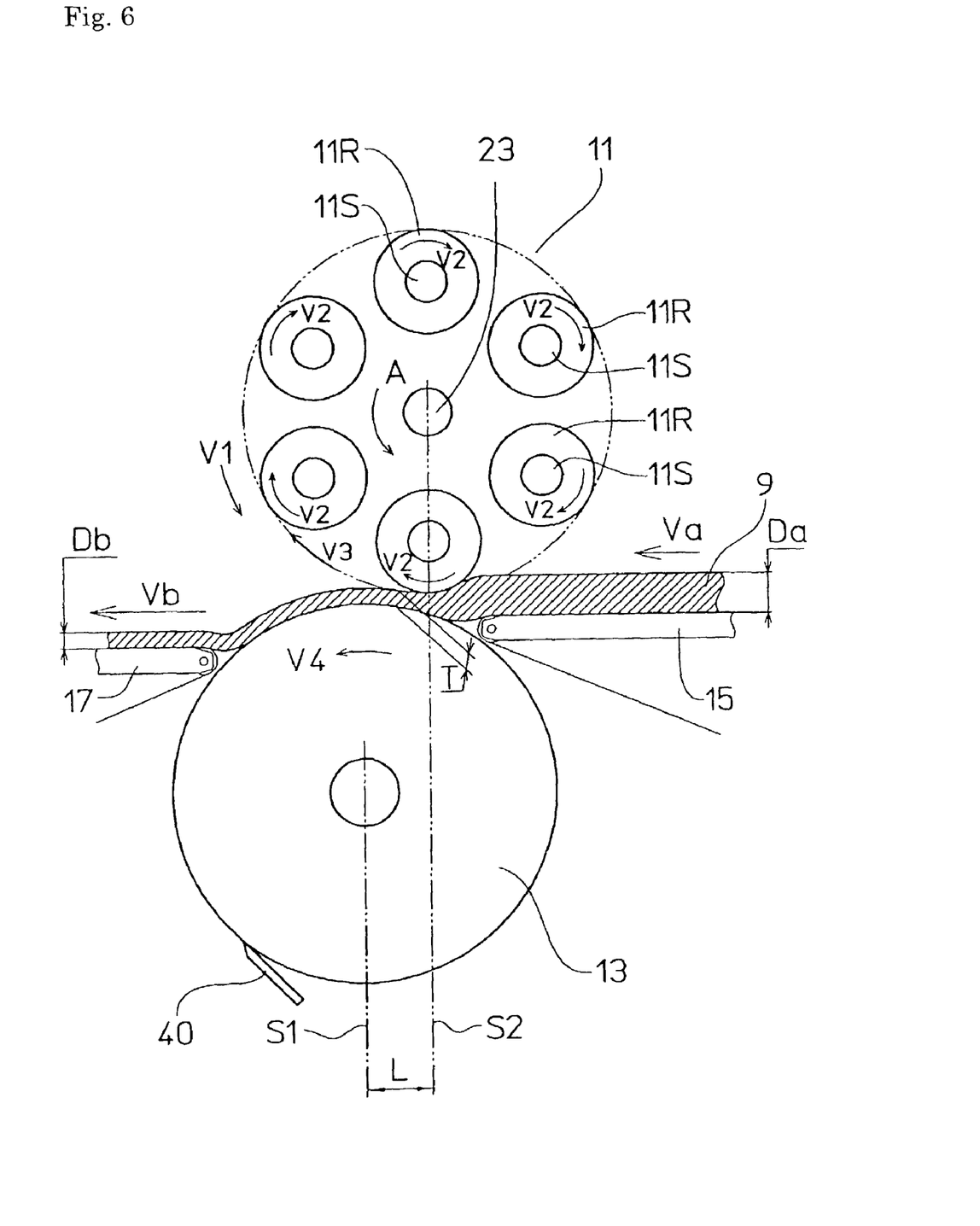
FIG. 6 shows a schematic elevational view of another embodiment of this invention.
Figure 7:
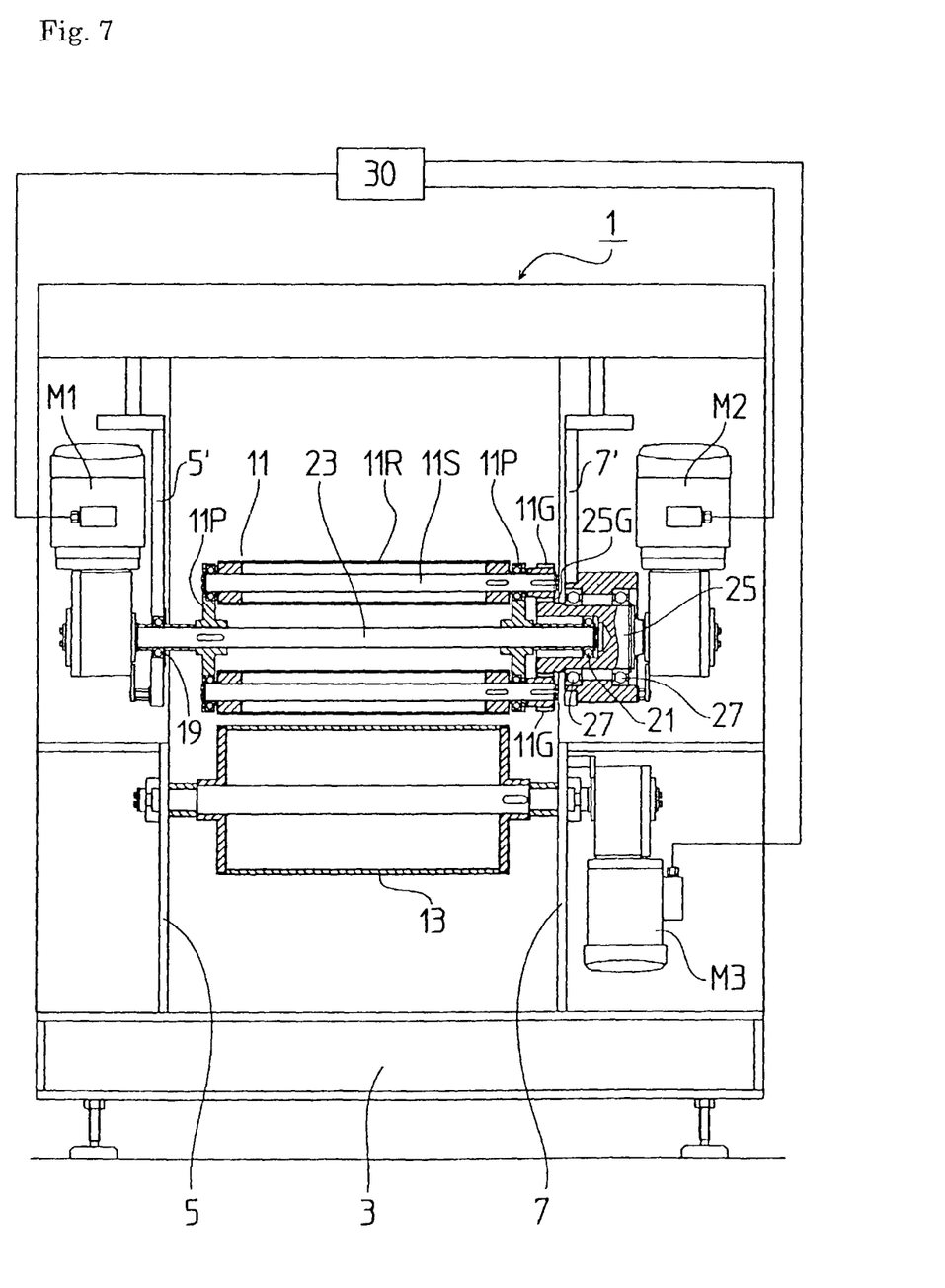
FIG. 7 shows a schematic side and partially cross-sectional view of the embodiment shown in FIG. 6.
Figure 8:
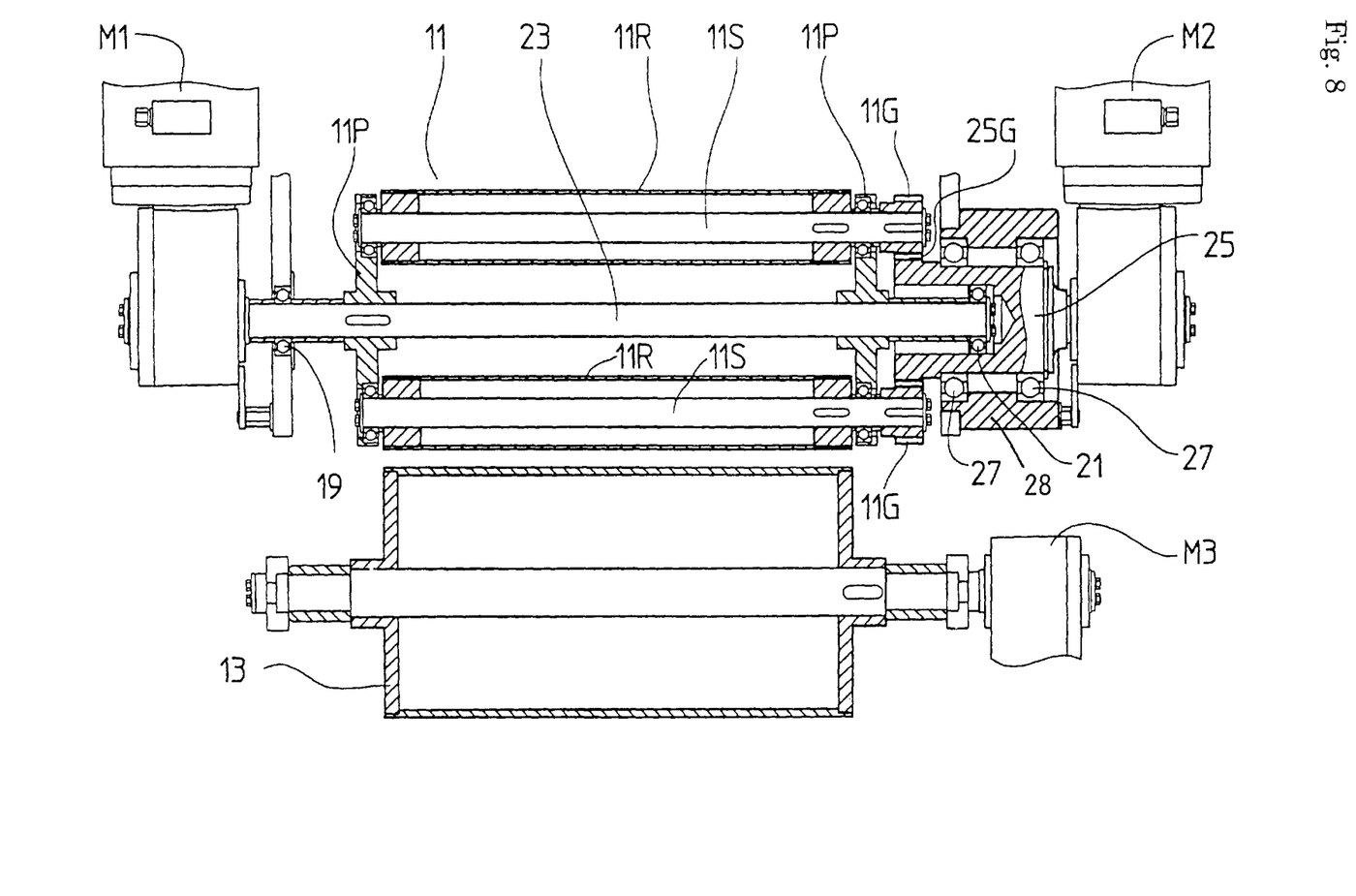
FIG. 8 shows an enlarged schematic side and partially cross-sectional view of the embodiment shown in FIG. 6.

FIG. 6 shows a schematic elevational view of an embodiment of this invention. FIG. 7 shows a schematic side view of an embodiment of this invention. FIG. 8 shows an enlarged schematic side view of the embodiment.

Lower side frames 5, 7 are arranged respectively on the right and left sides of a base 3. Upper side frames 5', 7' are arranged respectively above said side frames 5, 7. A first conveyer 15, a large diameter roller 13 downstream for conveying and rolling a food dough belt 9, for example, a bread dough belt, and a second conveyer 17 further downstream, are arranged in this order between these side-frames 5, 7, 5', 7'. A roller mechanism 11 is arranged facing the large diameter roller 13. A path for conveying the food dough belt 9 is set up between the roller mechanism 11 and the large diameter roller 13.

The longitudinal position of the roller mechanism 11 can be changed by a lifting device (not shown). Therefore, the gap between the roller mechanism 11 and the large diameter roller 13 can be controlled.

The path for conveying the food dough belt 9 may be arranged horizontally on the first conveyer 15, the conveying roller 13, and the second conveyer 17, as illustrated above, but also may be arranged vertically. In the latter case, the food dough belt 9 is conveyed vertically, and the roller mechanism 11 and the conveying roller, facing each other, may be arranged horizontally.

The roller mechanism 11 is installed on a rotating shaft 23 supported rotatably via bearings 19, 21 and a bearing 27 by the side frames 5', 7'. The rotating shaft 23 is coupled to a motor M1 such as a servo-motor (a first rotating means).

The roller mechanism 11 comprises a plurality of rolling rollers 11R rotatably supported at their ends by a pair of supporting plates 11P fixed apart from each other on the shaft 23. The rolling rollers 11R are provided as an example of means for sequentially beating and rolling the food dough 9. A plurality of planetary rollers 11R are arranged respectively at equal intervals on the same circle, the center of which is the axis of the rotating shaft 23. In other words, the planetary rollers revolve in an endless orbit by the rotation of the rotating shaft 23.

When the motor M1 rotates the rotating shaft 23 in the direction A, a plurality of the planetary rollers 11R revolve in the direction V1, opposite to the direction Va for transporting the dough belt 9, and, sequentially beat the dough belt 9 in the direction V1 and roll the dough belt 9 in the direction V2 along the transporting direction Va, Vb.

Figure 9:
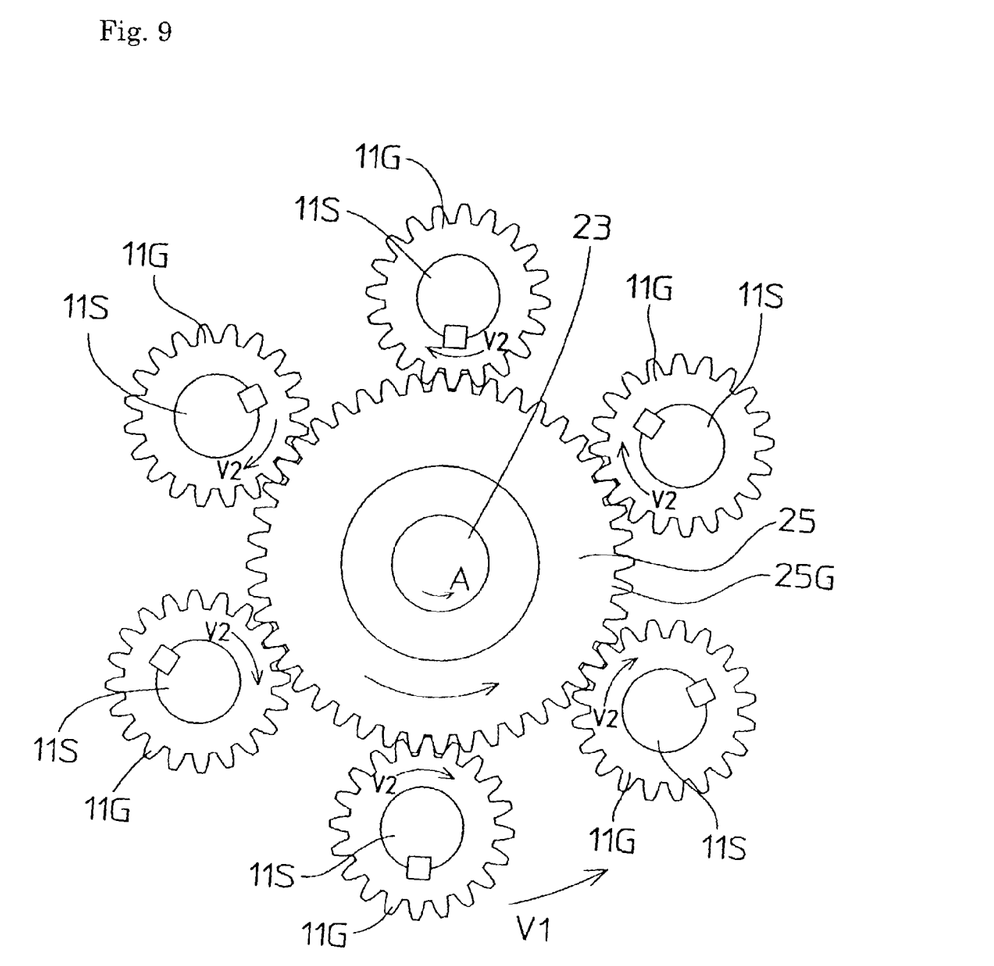
FIG. 9 shows a schematic view of a planetary gear mechanism of an embodiment of this invention.

The planetary roller 11R is fixed on the supporting shaft 11S. A planetary gear 11G is fixed at the end of the supporting shaft 11S. The planetary gear 11G engages with a gear 25G arranged in the periphery of a rotating shaft 25. In a central concavity of the rotating shaft 25, a bearing 21 is installed. The periphery of the rotating shaft 25 is supported via bearings 27 in a frame member 28, which is fixed to the frame 7'. The rotating shaft 25 is coupled to a motor M2, such as a servo-motor.

Therefore, when the motor M2 rotates the rotating shaft 25, the rotating shaft 25 rotates the planetary gear 11G, and then the planetary roller 11R rotates on its own axis. The direction of rotation of the planetary roller 11R is changed in accordance with the direction of rotation of the motor M2 rotates.

The revolving direction A and speed V1 of the planetary roller 11R circulating on the axis of the rotating shaft 23 are changed by the motor M1. Also, the rotating direction and speed V2 of rotation of the planetary roller 11R rotating on its own axis are changed by the motors M1 and M2.

For example, to explain simply, if the motor M2 is stopped and the motor M1 only rotates clockwise (or anticlockwise), the planetary gear 11G engaged with the gear 25 G revolves clockwise (or anticlockwise) on the gear 25G while rotating clockwise on its own axis, so that the planetary roller 11R rotates clockwise (or anticlockwise) on its own axis while revolving clockwise.

Next, the motor M2, and therefore the gear 25G, begins to rotate clockwise (or anticlockwise). As their rotating frequency increases gradually and becomes the same as the revolving frequency of the planetary roller 11R, the planetary roller 11R stops rotating and continues only revolving.

Therefore, the resulting speed V3 of the peripheral surface of the planetary roller 11R is composed of the revolving speed V1 and the rotating speed V2 of the planetary roller 11R.

The revolving direction or the moving direction of the planetary roller 11R depends on the rotating direction of the motor M2. Whether the planetary roller 11R moves downstream from upstream or upstream from downstream in relation to the direction of a dough belt being conveyed is determined by the direction of rotation of the motor M1. The rotating direction and the rotating speed V2 of the planetary roller 11R depend on the rotating speeds of the motors M1, M2.

The rotating speed V3 of the peripheral surface of the planetary roller 11R is the sum of the revolving speed V1 and the rotating speed V2 of the planetary roller 11R. The speed V4 of the peripheral surface of the conveying roller 13 is controlled to be equal to or almost equal to the speed V3.

In FIG. 6, the planetary roller 11R, in the lower part of its revolution, moves or revolves upstream in relation to the conveying direction of the dough belt. The revolving speed of the planetary roller 11R is V1. The rotating speed of the planetary roller 11R is V2. The resultant speed of the planetary roller 11R is V3. The rotating speed of the conveying and rolling roller 13 is V4. The revolving direction of the planetary roller 11R is A. The anticlockwise rotation of the gear 25 gives the planetary roller 11R the clockwise rotation (in relation to V2). V3 is controlled by V1 and V2 as follows:

$V2-V1=V3$. $V3=V4$, $V3\approx V4$, or $V3V4=C$ (constant).

The conveying roller 13 is rotated at the same speed as that of the second conveyer 17 by the motor M3, such as a servo-motor, to cooperate with said roller mechanism 11 and beat food dough 9. Code 30 indicates a control device to control each motor M1, M2, and M3.

The control device 30 controls the motors M1, M2 and M3 based on a calculated speeds of the rotation and revolution (or movement) of the planetary rollers 11R to vary the beating number and level of the planetary rollers 11R beating the food dough belt 9.

The beating direction of the planetary roller 11R depends on the direction of the revolution or movement of the planetary roller 11R.

The quality, quantity, direction, etc. of the beating for food dough are changed or decided experimentally based on the properties of the food dough, as, for example, fermentation conditions of the dough, achieved degree of the fermentation, uneven scattering of the bubbles in the dough, hardness and thickness of the dough, etc.

A stretching or rolling roller 13 has a large diameter, and a scraper 40 for removing deposits on the surface of the large diameter roller 13. Therefore, food dough being conveyed always contacts the clean surface of the large diameter roller 13, and is prevented from adhering to the roller 13. As the roller 13 has a large diameter, the surface of the roller 13 is easily scraped.

It is possible to increase the contacting surface of the thinly rolled or stretched dough belt on the conveying roller 13 by shifting the vertical surface S2 passing through the central axis of the planetary roller mechanism 11 from the vertical surface S1 of the conveying roller 13 toward the upstream direction of the food dough 9 being conveyed, as shown in FIG. 6. In another case, even if these two surfaces are in the same position, the contacting surface can be increased by installing the second conveyer 17 in the lower position of the conveying roller 13 (see FIG. 1).

There is an interval L between the first and second planes S1, S2, which are perpendicular to the direction for transporting food dough, as shown in FIG. 6. Code Da denotes a thickness of a food dough band 9 which is being fed to this apparatus. Code T denotes a gap formed by a planetary roller mechanism 11 and a conveying roller 13.

According to such an arrangement, any slipping between the thinly stretched food dough belt 9 and the surface of the conveying roller 13 is reduced by the larger contact-surface therebetween on the conveying roller 13, which has a large diameter, even if the conveying speed of the conveying roller 13 is faster than that of the first conveyer 15. Consequently, the stretching or rolling effect is increased.

Means for shifting the roller mechanism 11 to a position upstream of the conveying roller 13 is shown in JP-S63-54333-B (JP-S61-100144-A), of this applicant. The side frames 5', 7' can be arranged to be shifted relative to the conveying roller 13 on a conveying path of the dough belt 9, as shown in JP-S63-54333-B (JP-S61-100144-A).

Figure 10:
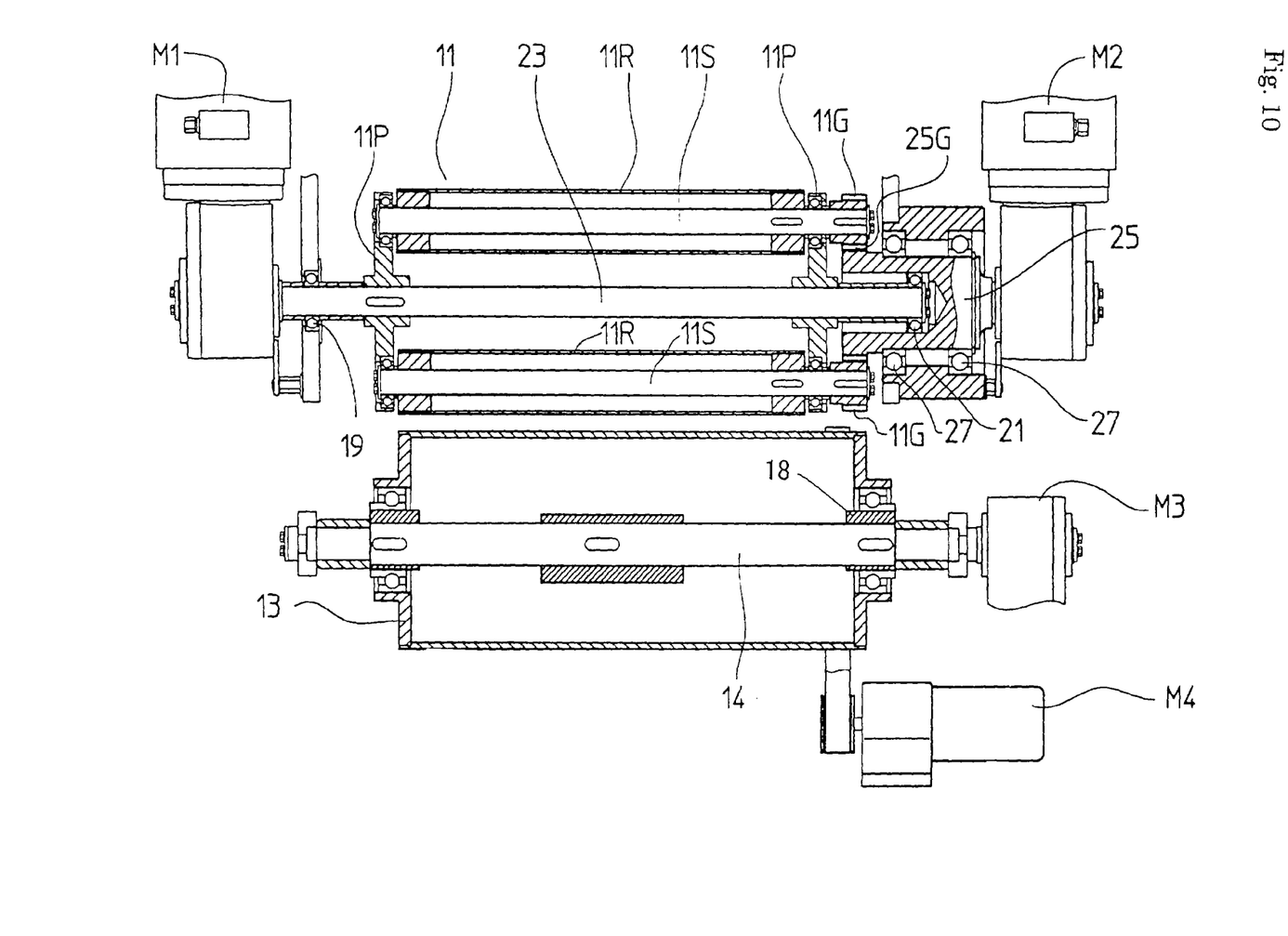
FIG. 10 shows a schematic front and partially cross-sectional view of another embodiment of this invention.

Further, to further promote the beating effect for food dough, the conveying roller 13 can be arranged to vibrate toward the roller mechanism 11, as shown in JP-2003-61561, by this applicant. The conveying roller 13 is rotatably supported on an eccentric member 14' fixed to a rotating shaft 14, as shown in FIG. 10. The conveying roller 13 is rotated by the motor M4 and vibrated by the eccentric member 14'.

The control method for an embodiment of this invention is described as follows:

First, the data on the properties, the thickness Da, and the feeding speed Va of the dough belt 9 carried in by the first conveyer 15 are input into the control device 30. Next, the thickness Db and the conveying speed Vb of the dough belt 9 carried out by the second conveyer 17 are input into the control device 30.

In accordance with these operations, a gap T between the roller mechanism 11 and the conveying roller 13, the revolving speed V1, the rotating speed V2, the conveying speed V4 and the resultant speed V3, etc., are set. For example, considering the spring-back nature of bread dough, etc., the gap T would be set to be somewhat small. Further, if necessary these set values would be adjusted experimentally based on the food dough actually adopted.

The number of beats on the food dough depends on the revolving-speed and the number of planetary rollers 11R, and the conveying speed of the food dough. It can be adjusted in accordance with the manufacturing speed and the nature of the food dough material, such as its elasticity, hardness, softness, thickness, etc.

According to this invention, the number of beats against the dough belt 9 can be changed by the revolving speed V1 being kept at V3/V4=C (constant), as described above. Therefore, various types of bread dough can be pretreated favorably.

The fermentation of the bread dough begins after the mixing. According to the progress of the fermentation, the strength of the gluten structure in bread dough is different. The homogenization of food dough such as bread dough can be accomplished by beating and moving actions according to the prior treatment of this invention.

When multilayered dough like pie dough is rolled, the upper surface layer can be controlled not to be transferred downstream faster than the surface layer, by the peripheral speed V3 of the planetary roller 11R, which is slower than that V4 of the conveying roller 13 (V3<V4).

Also, if V3 and V4 are approximately the same, no slippage between the roller and the dough belt causing the dough to stick to the roller will arise, even when food dough 9 is rolled momentarily. Consequently, the amount of dusting powder can be applied at the necessary minimum.

A ring-shaped external gear, with which an internal gear 25G (shown in FIGS. 7, 8, and 9) is replaced, may be arranged to engage the planetary gears 11R arranged inside.

Figure 11:
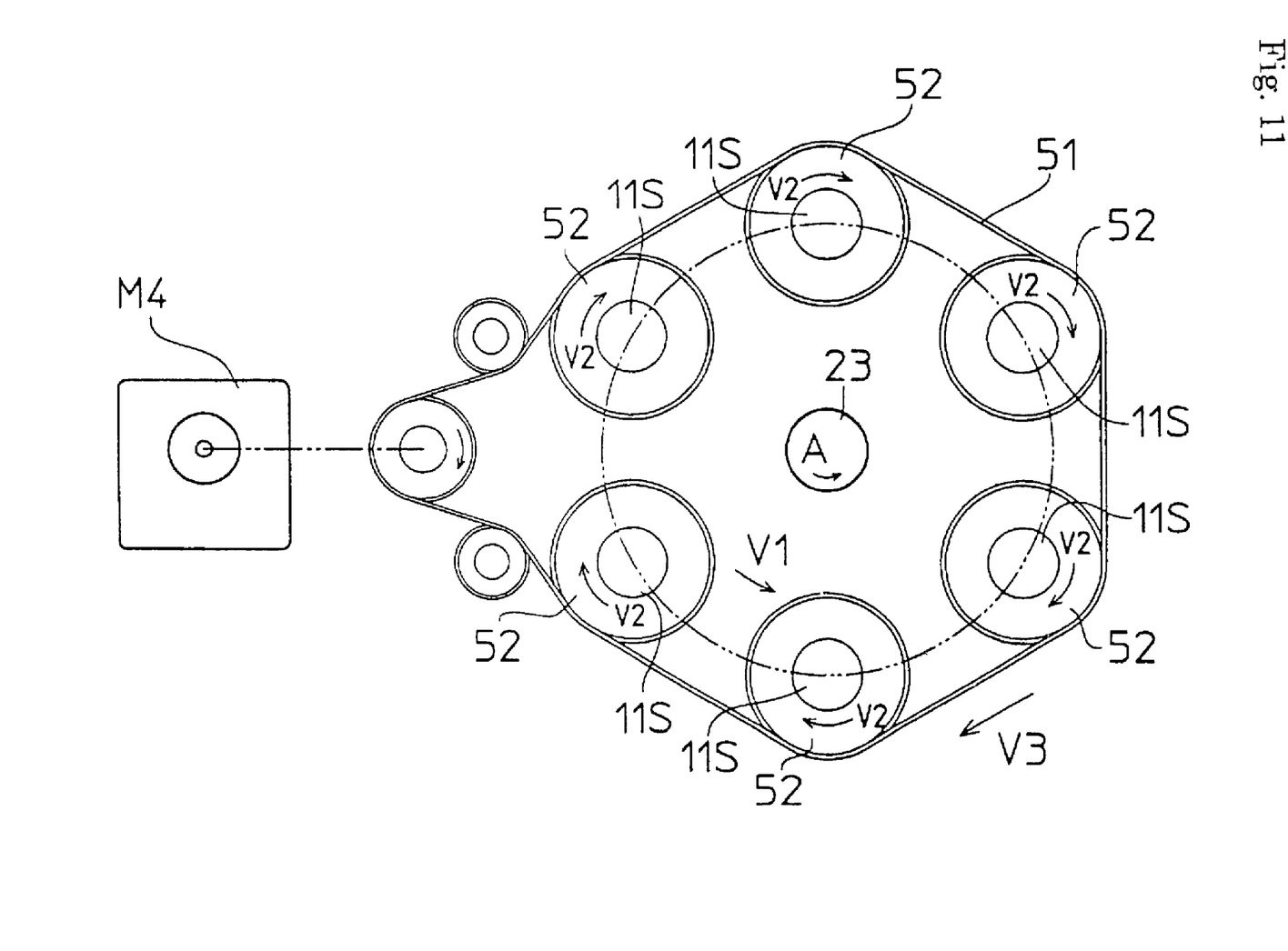
FIG. 11 shows a schematic view of a planetary roller mechanism of an embodiment of this invention.

FIG. 11 shows a schematic elevational-view of another embodiment of this invention. A timing belt 51 and a plurality of timing pulleys 52, with which the internal gear 25G and a plurality of the planetary gears 11G (shown in FIGS. 7, 8, and 9) are replaced, may be arranged to rotate the timing pulleys 52 and then the planetary rollers 11R.

Figure 12:
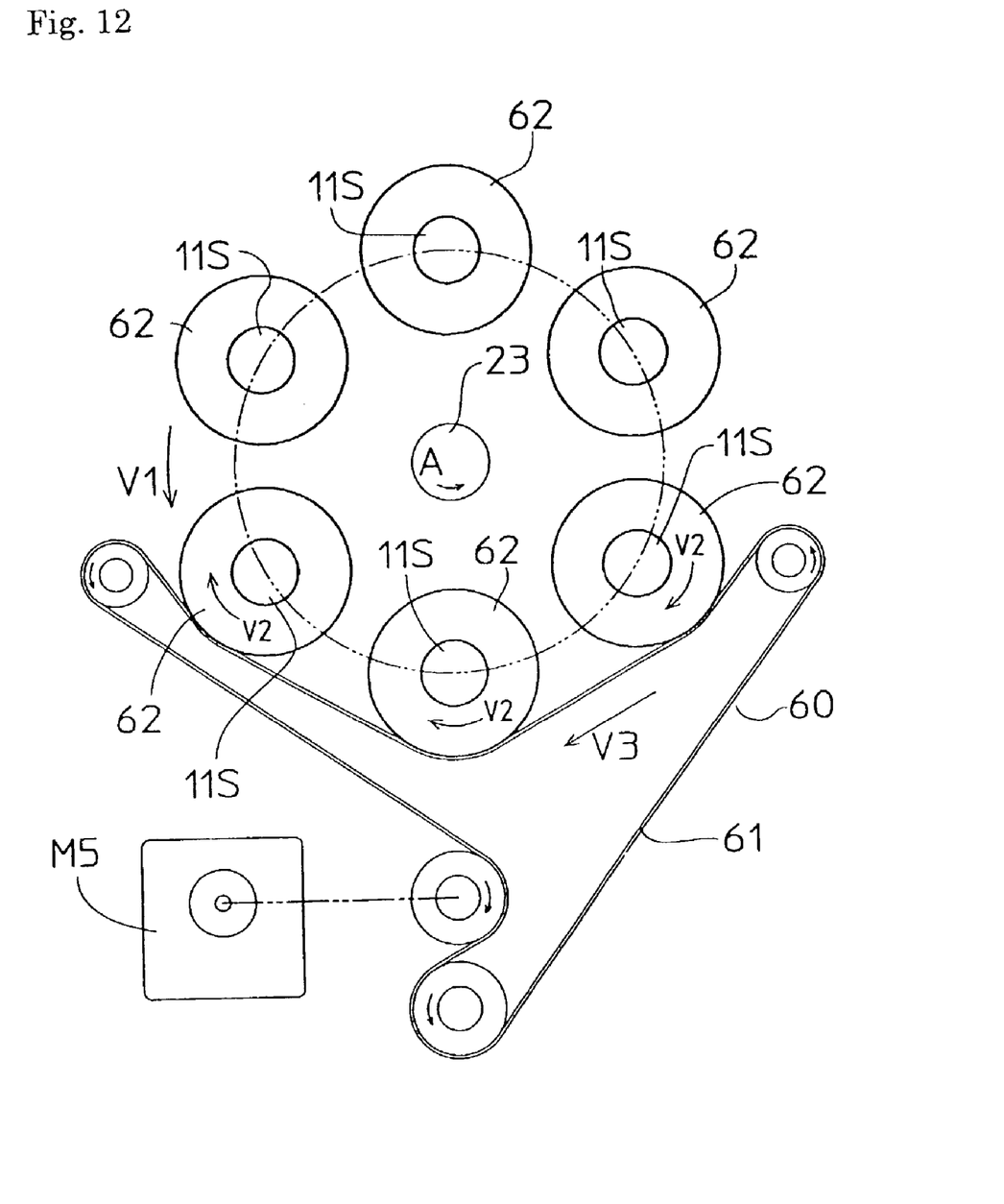
FIG. 12 shows a schematic view of a planetary roller mechanism of another embodiment of this invention.

FIG. 12 shows a schematic elevational-view of another embodiment of this invention. In the lower part of the roller mechanism 11, a driving belt mechanism 60, which causes the planetary rollers 11R to revolve, is arranged. A driving belt 61 is circulated by a motor M5, such as a servo-motor, and rotates a plurality of pulleys 62 fixed to the planetary rollers 11R in frictional contact, only when the pulleys 62 revolve in the lower part of the planetary roller mechanism 11. Then, the planetary rollers 11R are rotated and revolved by the pulleys 62.

According to this invention, it becomes possible, without harming the gluten network, for fermentation-gas that is included within bubbles which exist in a surface layer of a bread dough belt to be released, and for the inside or crumbs of bread dough to be homogeneous and of a fine quality. Therefore, various forms or molds in the post-process can be made.

According to this invention, even if many conditions of the bread dough are changed, the effect on the quality of the bread can be controlled at a minimum, and bread of a high quality can always be produced. Also, wrinkles generated on the surface of the rolled bread dough can be suppressed.

Further, the surplus gas in food dough such as bread dough, pie dough, etc., can be effused, and the bubbles scattered in the dough surface can be discharged or released. Therefore, the dough surface becomes clean.

Furthermore, though conventionally much dusting powder has been applied to prevent bread dough or pie dough from adhering to a rolling apparatus, the volume of dusting powder applied can be decreased, according to this invention.

Also, although conventionally complicated separate preparations and processes were needed to recover the elasticity of the bread dough lost by the mechanical formation, such a necessity has been obviated by this invention.

The invention claimed is:

1. A system, comprising:
    a fermented dough belt; and
    an apparatus for beating and rolling the fermented dough belt between rolling members to release surplus fermentation-gas in the dough belt, the apparatus comprising a first rolling member having a plurality of rolling-rollers, the first rolling member rotating upstream from downstream at the position where the first rolling member is in contact with the dough, each rolling roller revolving sequentially upstream from downstream at the position where each rolling roller is in contact with the dough and always rotating downstream from upstream at the position where each rolling roller is in contact with the dough, each of the rolling rollers beats and rolls the dough belt being conveyed,
        a second rolling member, which conveys and rolls the dough belt between the first and the second rolling members;
        a first conveyer disposed at the upstream side of the second rolling member, and
        a second conveyer disposed at the downstream side of the second rolling member,
        wherein the dough belt moves from the first conveyer to the second conveyer and is conveyed by the second conveyor to a next process and
        when the dough belt moves from the first conveyer to the second conveyer and to the next process, the horizontal direction of the movement of the dough belt is not changed;
    wherein the first rolling member is installed on a shaft driven by a motor, each of the plurality of rolling-rollers is mounted on a respective rotating shaft, each of the rotating shafts having a planetary gear fixed at one end, and the planetary gears being engaged with a gear mounted on another shaft driven by another motor.

2. The system according to claim 1, wherein the rolling rollers circulate in an endless orbit.

3. The system according to claim 1, wherein a peripheral speed V3 of the rolling roller, calculated by subtracting a rolling roller rotating speed V2 from a rolling roller revolution speed V1, is equal to or slower than a conveying speed V4 of the second rolling member.

4. The system according to claim 1, wherein the first rolling member is a planetary roller mechanism or a planetary gear mechanism.

5. The system according to claim 1, wherein the second rolling member comprises a conveying and rolling roller with a larger diameter than that of the planetary rolling roller.

6. The system according to claim 1, wherein the second rolling member comprises a conveying and rolling roller and a feeding conveyer having a space between them for releasing the gas.

7. A method for beating and rolling a fermented dough belt between rolling members to release fermentation-gas in the dough belt, comprising:
    conveying the dough belt onto a second rolling member by a first conveyer,
    beating and rolling the dough belt being conveyed on the second rolling member, by a first rolling member rotating upstream from downstream at the position where the first rolling member is in contact with the dough, the first rolling member having a plurality of rolling rollers each rolling roller revolving sequentially upstream from downstream at the position where each rolling roller is in contact with the dough and
    rotating downstream from upstream at the position where each rolling roller is in contact with the dough,
    conveying the dough belt from the second rolling member by a second conveyer, and
    conveying the dough belt to a next process;
    wherein, when the dough belt moves from the first conveyer to the second conveyer and to the next process, the horizontal direction of the movement of the dough belt is not changed;
    wherein the first rolling member is installed on a shaft driven by a motor, each of the plurality of rolling-rollers is mounted on a respective rotating shaft, each of the rotating shafts having a planetary gear fixed at one end, and the planetary gears being engaged with a gear mounted on another shaft driven by a another motor.

* * * * *